March 25, 1952 — N. N. STEPHANOFF — 2,590,219
METHOD OF EFFECTING CHEMICAL REACTIONS
Filed June 15, 1945 — 7 Sheets-Sheet 1

INVENTOR
Nicholas N. Stephanoff
BY Busser & Harding
ATTORNEYS.

WITNESS: Robt R. Kitchel.

March 25, 1952  N. N. STEPHANOFF  2,590,219
METHOD OF EFFECTING CHEMICAL REACTIONS
Filed June 15, 1945  7 Sheets-Sheet 2

WITNESS:

INVENTOR
Nicholas N. Stephanoff
BY
ATTORNEYS.

March 25, 1952     N. N. STEPHANOFF     2,590,219
METHOD OF EFFECTING CHEMICAL REACTIONS
Filed June 15, 1945     7 Sheets-Sheet 3

WITNESS:

INVENTOR
Nicholas N. Stephanoff
BY
ATTORNEYS.

March 25, 1952 — N. N. STEPHANOFF — 2,590,219
METHOD OF EFFECTING CHEMICAL REACTIONS
Filed June 15, 1945 — 7 Sheets-Sheet 5

INVENTOR
Nicholas N. Stephanoff

March 25, 1952 — N. N. STEPHANOFF — 2,590,219
METHOD OF EFFECTING CHEMICAL REACTIONS
Filed June 15, 1945 — 7 Sheets-Sheet 6

WITNESS:

INVENTOR
Nicholas N. Stephanoff
BY
ATTORNEYS

March 25, 1952   N. N. STEPHANOFF   2,590,219
METHOD OF EFFECTING CHEMICAL REACTIONS
Filed June 15, 1945   7 Sheets-Sheet 7

INVENTOR
Nicholas N. Stephanoff
BY
Busser~Harding
ATTORNEYS.

WITNESS:

Patented Mar. 25, 1952

2,590,219

UNITED STATES PATENT OFFICE 2,590,219

METHOD OF EFFECTING CHEMICAL REACTIONS

Nicholas N. Stephanoff, Bryn Mawr, Pa., assignor, by mesne assignments, to C. H. Wheeler Manufacturing Company, a corporation of Pennsylvania Application June 15, 1945, Serial No. 599,690

6 Claims. (Cl. 23—1)

This invention relates to methods and apparatus for treating materials and particularly to treatment in which materials are suspended in elastic fluid in the form of solid or semi-solid particles or droplets. In particular, the invention relates to the catalytic treatment of materials wherein a liquid, solid or semi-solid catalyst is involved.

This application is, in part, a continuation of my applications Serial Number 460,401, filed October 1, 1942, and issued as U. S. Patent No. 2,460,546 on February 1, 1949, and Serial Number 547,942, filed August 3, 1944, and now abandoned.

While, as will be made evident hereafter, the invention is applicable for many other purposes, it will be in the interest of simplicity of description to consider primarily its very important application to the catalytic cracking of petroleum hydrocarbons.

There has come into widespread use a treatment of hydrocarbons by the use of solid catalytic particles in which the particles are caused to flow upwardly in elongated stacks by entrainment in flowing hydrocarbon vapors. This process of treatment or cracking has as its advantages the exposure of relatively large catalyst areas to the vapors with continuous agitation to the end that substantially all portions of the vapors are brought into proximity to the catalyst surfaces with consequent improvement in the rate and completeness of the action.

In accordance with the prior procedure, however, various disadvantages occur making the process costly and inefficient. Since a single pass of catalyst and the hydrocarbon vapor upwardly in a stack is relied upon to accomplish the reaction, the attainment of the necessary reaction time requires both relatively low rates of flow and the use of extremely high and expensive stacks. Additionally, once the catalyst is entrained it must be separated from the outflow vapors and this requires elaborate and expensive apparatus. The percentage yield is also small requiring, in particular, that after fractionation of the product the unreacted portions thereof must be returned to the apparatus for further cracking. The catalyst, furthermore, after it is separated must be regenerated to be effectively reused. The entire procedure, furthermore, involves the loss of large quantities of the very expensive catalyst so that if it were not for the considerable advantages of the procedure it would be relatively impractical.

In accordance with the present invention, and still considering catalytic cracking of petroleum vapors, various advantages are secured in simple fashion.

First, there is made possible the use of very much smaller catalyst particles than heretofore used by elimination of separation troubles, the small particles offering very much greater surface areas per given mass of catalyst. In the breaking up of the catalyst particles new surfaces are exposed to the material undergoing treatment with resulting increased effectiveness of action.

Secondly, high velocities of flow are obtainable without diminution of the reaction time and, in particular, an intense agitation of the catalyst particles in the vapors may be secured with consequent cleansing of the particles or the prevention of formation of carbon coatings which would have to be burned off, thus rendering the catalyst useable for a longer period of time between the regenerating operations.

Third, the apparatus necessary to give equivalent reaction paths or equivalent reaction times is very much smaller than the apparatus required for the presently used processes. On the other hand, if apparatus of comparable size is used the reaction paths and times may be very greatly prolonged to the end that far more complete reaction occurs before a given quantity of vapor leaves the apparatus. This reduces to a considerable extent the proportion of the hydrocarbons which must be returned after fractionation.

The foregoing will indicate general objects of the invention which are, of course, not only applicable to the treatment of petroleum hydrocarbons but for many other treatments of non-gaseous materials in gas or vapor. In such treatments the comminuted material in the form of droplets or particles need not necessarily have catalytic action but may be taking part in the reaction, as, for example, where a reaction is desired between solid particles and gas or vapor or where mists of liquid droplets are to be reacted with each other, with solid particles or with gases or vapors.

The above indicated objects, as well as numerous subsidiary objects of the invention particularly relating to details of methods and apparatus, will be apparent from the following description read in conjunction with the accompanying drawings, in which.

Figure 1:
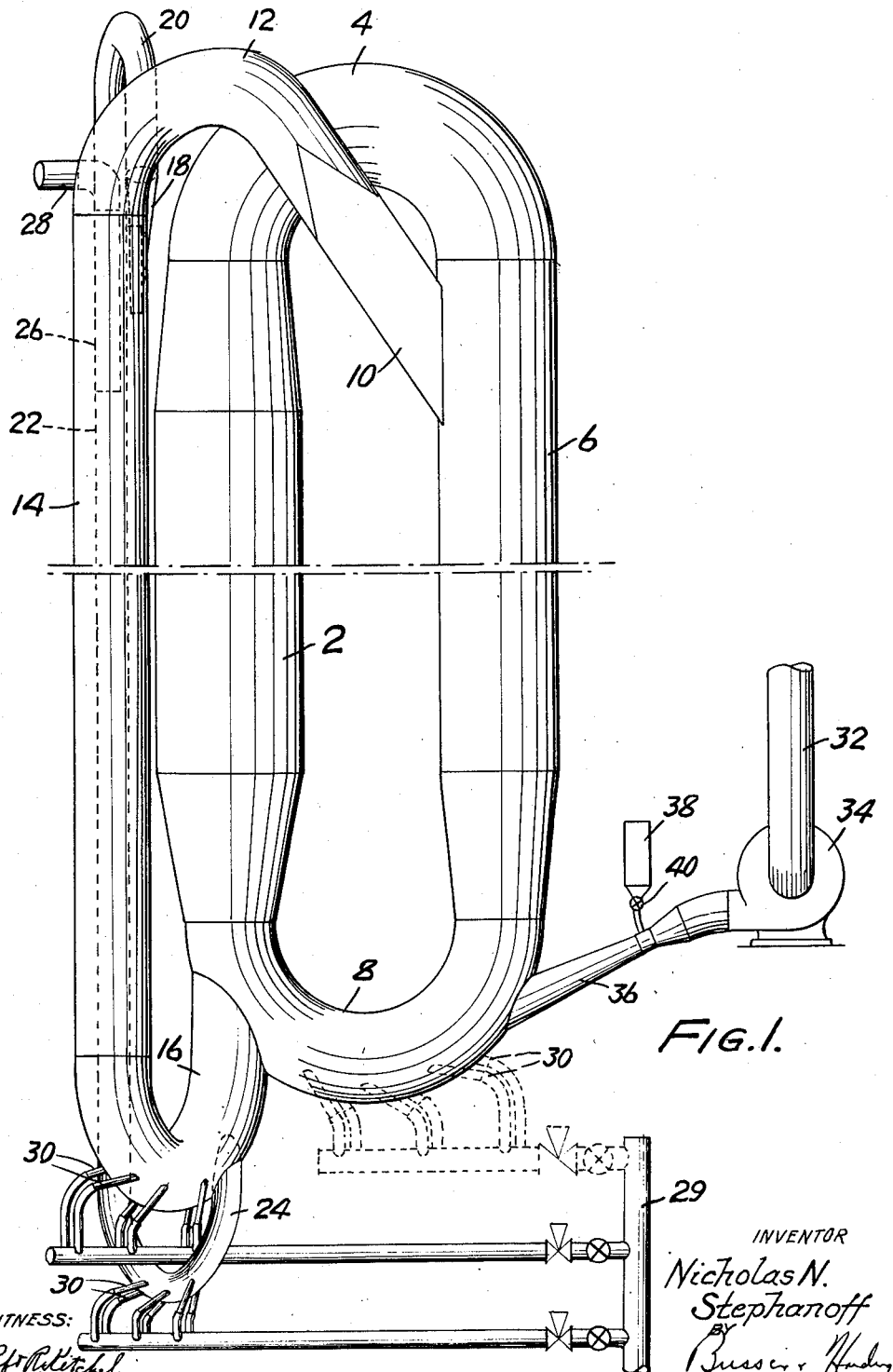
Figure 1 is an elevation showing one preferred form of apparatus for use in carrying out the methods of the invention.
Figure 2:
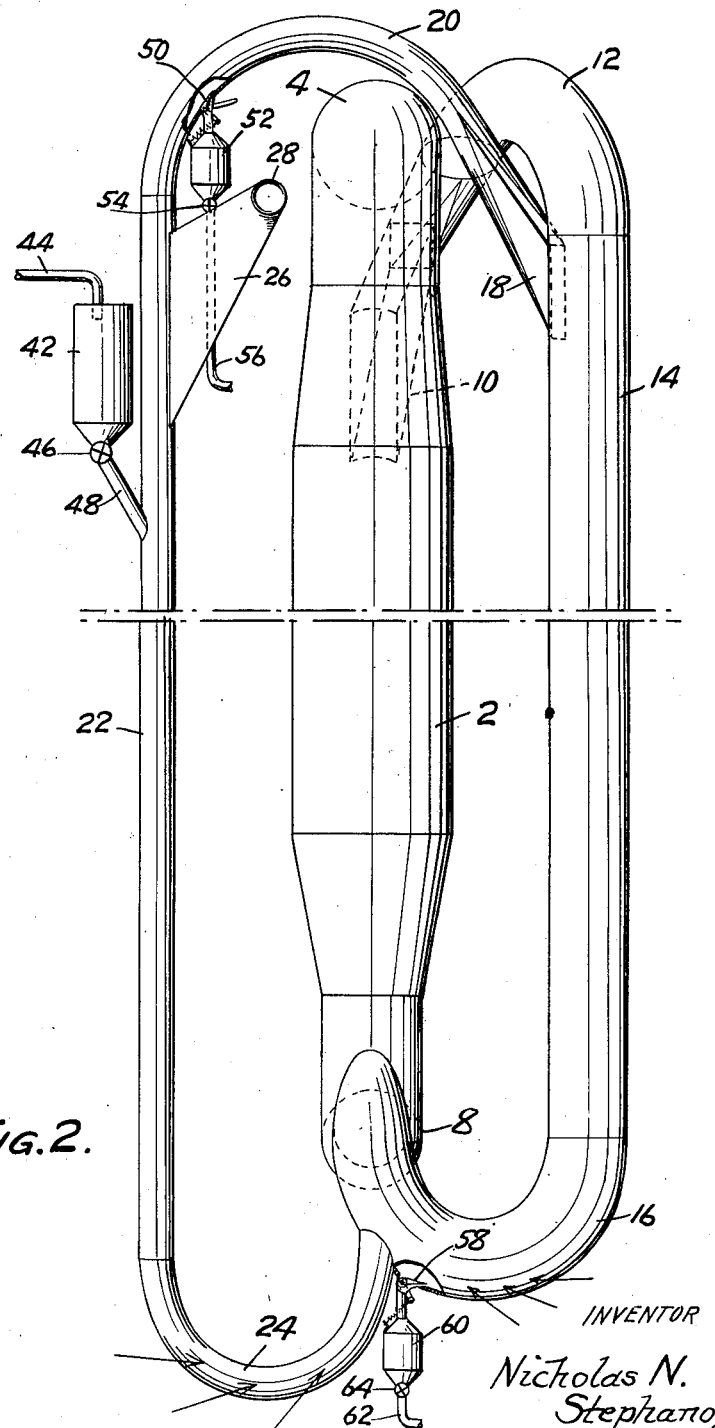
Figure 2 is an elevation of the same looking at the right of Figure 1.

Referring first to Figures 1 and 2 which illustrate a preferred and typical form of apparatus provided in accordance with the invention, there is shown at 2 an upright stack communicating at its upper end with a tubular turn 4 which, in turn, communicates with a stack 6, joined by a turn 8 to the lower portion of the stack 2 to complete a loop. An outlet 10, reversely directed with respect to downflow through the stack 6 just beyond the turn 4, communicates through a turn 12 with the upper end of another down stack 14 which, in turn, is also joined with the lower portion of the stack 2 by a turn 16 to complete a second loop. An outlet 18 reversely directed with respect to the flow through the upper portion of stack 14 beyond the turn 12 communicates through a turn 20 with a third down stack 22 which is also joined to the lower end of the stack 2 by the turn 24 to provide a third loop. An outlet 26 from the stack 22 is also reversely directed with respect to flow therethrough beyond the turn 20 and communicates with a takeoff passage 28.

Gas or vapor is provided at high pressure through a header 29 and thence through control valves to nozzles 30 which may be variously arranged to introduce high velocity jets of elastic fluid into the lower turns referred to above or into the lower portion of the stack 2 to induce high velocities of circulatory flow through this stack and its various connections.

While alternative provisions may be made, elastic fluid at low pressure introduced through a line 32 into a blower 34, may be used to produce a flow of liquid, solid or semi-solid material through a nozzle or Venturi passage 36 into the apparatus as indicated from a supply 38, the feed of the material being controlled by a metering valve 40 if desired.

Additionally or alternatively, liquid, solid or semi-solid material may be introduced into the apparatus from a supply tank or hopper 42 through a metering valve 46 and connection 48, being held, if necessary, under pressure applied through a connection 44. It will be understood as hereafter pointed out that the entire apparatus may operate either under pressure or vacuum and the requisite pressure condition may be maintained in this fashion upon material being introduced.

As will become apparent hereafter in discussion of the operation, non-gaseous materials which may be recirculated in suspension in the apparatus may be retained therein under ordinary conditions beyond a proper period and it may be desirable to remove periodically some or all thereof. To accomplish this, take-off devices may be applied to the apparatus. One of these is indicated at the upper portion of the apparatus on the inside of turn 20. It comprises a pivoted valve-like member 50 arranged, when open, to scoop material into a receiver 52, the outlet of which is controlled by a valve 54 communicating with a pipe 56 which may lead the removed material to a desired location. If the apparatus is running with heavier or larger particles of material, and if they enter the turn 20, they will all be flowing at the outside thereof and consequently this take-off is so arranged as to remove very fine material.

If intermediate sizes of material are to be removed, the take-off arrangement may be provided as in the lower portion of turn 16. If flow is cut off from the nozzles of this turn the opening of scoop 58 will serve to remove particles of larger size thrown centrifugally outwardly in the turn 16 and cause these to pass into the receiver 60, the outlet of which to the pipe 62 is controlled by a valve 64. It will be evident that such take-off devices may be provided in various positions in the apparatus depending upon the points from which material is to be removed and upon the sizes of the materials to be removed.

The apparatus, as applied for example to the catalytic treatment of petroleum hydrocarbons, is so operated as to provide recirculation of catalysts, with very considerable agitation, in suspension in the hydrocarbon vapors. These may be introduced substantially solely through the nozzles 30 with possible additional introduction through some such connection as 32—33. The catalyst introduced in either coarse particles or preliminarily finely ground particles or any intermediate sizes will find its way to the bottom of the upright passage 2. In this stack if the particles are large they may move upwardly and then drop under the action of gravity without passing through the turn 4. Generally speaking, it will be desirable to have the apparatus of considerable height as indicated by the breaks in Figures 1 and 2. In the turn 4, centrifugal action will take place so that heavier particles will be thrown outwardly and, as evident in Figure 1, will enter the downflow passage 6 substantially to the right thereof. As a result, such particles will pass the exit 10 without entering the same and will return through the turn 8 to the stack 2. With a proper adjustment of relative sizes of the parts and with the maintenance of high circulatory velocities by the action of the nozzles, the result may be that only quite fine particles or droplets will enter the outlet 10. Those which do pass through the outlet and then into the bend 12 will be again subjected to centrifugal action to be thrown to the outside of the bend 12 and the far side of the stack 14. If that occurs they will miss the outlet 18 and will also return to the bottom of the stack 2. Another similar separating action will occur in the bend 20 and particles or droplets separated therein will miss the outlet 26 and will also be returned to the bottom of the stack 2. A multiple centrifugal separation thus takes place, the nature of which will be more fully apparent hereafter.

Additionally, it is to be noted that recirculation of the elastic fluid will occur through the various passages generally in such fashion that in a particular loop there may be recirculating an amount of elastic fluid considerably in excess of that which leaves the outlet from the loop.

Advantage is taken of this to insure that the major number of molecules of elastic fluid will have very long recirculatory paths in the apparatus.

Figure 3:
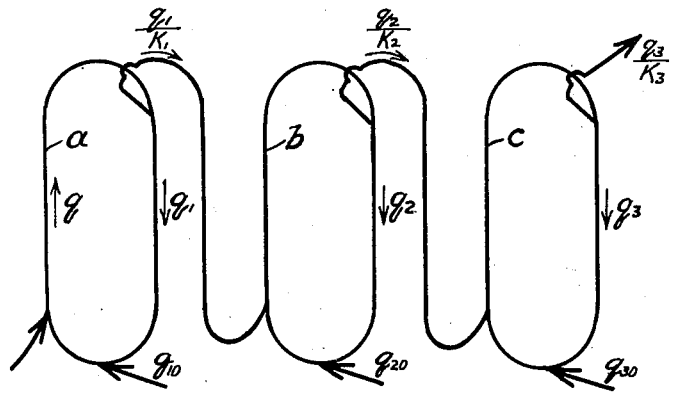
Figures 3, 4 and 5 are diagrams showing the recirculatory principles involved in accordance with the invention.
Figure 4:
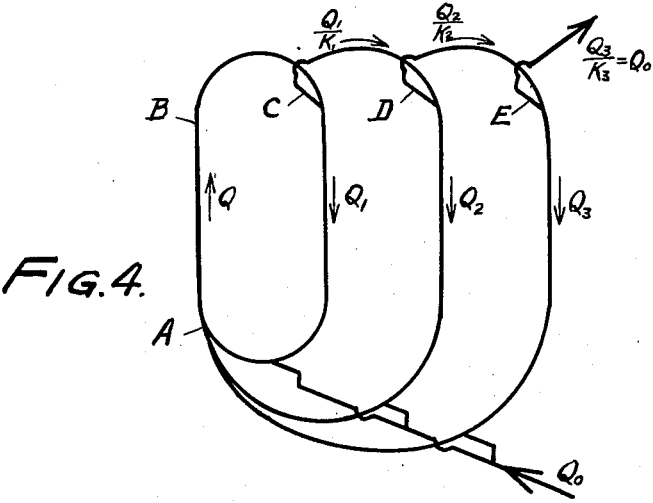
Figure 5:
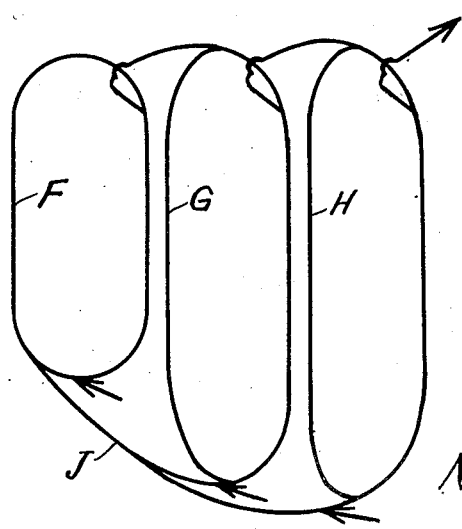

The highly advantageous characteristics of the apparatus of Figures 1 and 2 and its comparison with other types of apparatus hereafter described will be best understood by considering Figures 3, 4 and 5 which indicate diagrammatically the flow characteristics in various arrangements of apparatus.

Referring first to Figure 4, it will be evident that there are diagrammed therein the flow paths existing in the apparatus heretofore described. The quite long effective length of path through which a molecule of vapor is subjected to the action by the catalyst as compared with the total actual length of the passages provided by the apparatus will be evident from the following discussion of an idealized arrangement.

Figure 4 shows three loops of the reaction apparatus diagrammed with the common return point at the bottom of the main stack B indicated at A, and the respective outlets at C, D and E. Suppose that at outlet C the mass $Q_1$ of vapor passes the outlet while the mass $$\frac{Q_1}{K_1}$$

escapes. $K_1$ will be a number dependent upon the characteristics of the apparatus and its operation and can be made of the order of upwards of 9, generally, in practice, of the order of 12 to 20. Similarly at outlets D and E the escaping vapor will be respectively $$\frac{1}{K_2} \text{ and } \frac{1}{K_3}$$

of the amount returning.

Equating the quantities flowing at the outlets, and since there will be escaping at E the quantity $Q_0$ entering the apparatus:

$$Q_3 = K_3 Q_0$$
$$Q_2 = K_2\left(1+\frac{1}{K_3}\right)Q_3$$
$$Q_1 = K_1\left(1+\frac{1}{K_2}\right)Q_2$$
$$Q = \left(1+\frac{1}{K_1}\right)Q_1$$

so that:

$$Q_3 = K_3 Q_0$$
$$Q_2 = K_2 K_3\left(1+\frac{1}{K_3}\right)Q_0$$
$$Q_1 = K_1 K_2 K_3\left(1+\frac{1}{K_2}\right)\left(1+\frac{1}{K_3}\right)Q_0$$
$$Q = K_1 K_2 K_3\left(1+\frac{1}{K_1}\right)\left(1+\frac{1}{K_2}\right)\left(1+\frac{1}{K_3}\right)Q_0$$

From the last equations there may be estimated the cross-sections of the various passages for attainment of desired velocities of flow.

The great length of probable path of any molecule of vapor entering at $Q_0$ may be estimated from the following formula which gives the probability $P_N^\infty$ that a molecule will circulate through some combination of the loops at least N times, assuming, for simplicity, that $K_1 = K_2 = K_3 = K$:

$$P_N^\infty = \left\{1 - \frac{1}{(1+K)^3}\right\}^N$$

Assuming, for example, that $K=9$, the probability of 50 or more circulations is 0.95, and of 100 or more circulations is 0.90. Stated otherwise, if the total length of each loop is L, 95% of the molecules of vapor will circulate through a total length of path of at least 50L and 90% will circulate through a total length of path at least 100L. Further, about 50% of the molecules will circulate through a total length of path at least 500L. Only 0.1% will escape without recirculating, but will still follow the path provided by the common passage B and the upper turns and the outlet connections. Obviously, therefore, the possibility that a molecule will not undergo action is small. Even though relatively high velocities of flow are used, the great length of path of flow of the major proportion of the molecules insures an extended period for action before they leave the apparatus.

What has been described for a molecule is equally applicable to the catalyst particles, but in their case the values of the K's are very much larger even for the smallest catalyst particles. For particles over a certain size the K's will be effectively infinite, so that they will not escape through any of the outlets. As they grind, smaller particles will result for which the K's will be smaller so that eventually they may escape. But even extremely minute catalyst particles will have very long probable total paths.

The striking advantages of a recirculating and separating system of the type illustrated in Figure 4 will be more apparent when compared with a simple series arrangement of loops as in Figure 3. Such an arrangement is far from lacking in utility and is considered as within the scope of the present invention having the advantage of involving simple units, easily associated with each other, and suitable when extreme lengths of paths are not required. In the case of Figure 3, the loops are indicated at $a$, $b$, and $c$ and corresponding masses of flow are indicated for the various parts of the apparatus by small $q$'s which may be compared with the Q's of Figure 4.

Considering a molecule entering at $q_{10}$, the probability $P_N^\infty$ that it will recirculate N or more times through some combination of the loops is given by:

$$P_N^\infty = \frac{S^N}{2}\{(N+1)(N+2) - 2N(N+2)S + N(N+1)S^2\}$$

wherein S is written for $$\frac{K}{1+K}$$

From this formula it will be found that, for $K=9$, the probability of 50 or more circulations is 0.193 while the probability of 100 or more circulations is 0.00163. From this the enormous difference between the systems of Figures 3 and 4 will be apparent.

Figure 6:
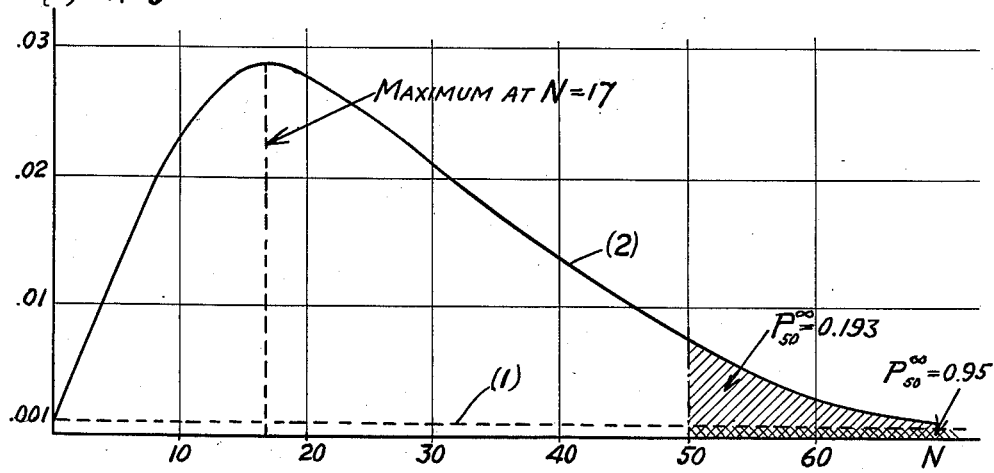
Figure 6 is a graph explanatory of the principles involved.

The relative characteristics of the two systems, bringing out in particular an advantage of the system of Figure 3 will be best understood from Figure 6 in which, for the two systems are plotted against N the probabilities P(N) that a molecule entering a system (at $q_{10}$ in the case of Figure 3) will recirculate exactly N times. The equations for P(N) are given in the figure.

In the case of Figure 4 the curve (1) applies. This is a curve very gradually approaching the axis asymptotically, so gradually, in fact, that at the scale illustrated it is almost parallel to the axis through the region illustrated. Its greatest value is at $N=0$, i. e., no recirculation. Being a probability curve (actually having steps though a smooth curve is drawn through the points) the total area under it is unity. Since the area up to, say, $N=50$ is small, the major part of its area representing $P_N\infty$ is large, being 0.95 as pointed out above.

In the case of Figure 3, however, the curve is quite different as illustrated at (2). This curve starts at the same value (0.001) as curve (1) at $N=0$, but then rises to attain a maximum at $N=17$ for the values given, thereafter rapidly approaching the axis asymptotically. Again the area under the curve (stepped) is unity. In this case, however, the large area under the initial portion of the curve means that the area beyond such a point as $N=50$ is small, giving a value of $P_N\infty$ of 0.193 as pointed out above.

Curve (2) illustrates the advantage of the arrangement of Figure 3 if only a moderate amount of recirculation is desired and it is desirable that no more than some number of recirculation of the major part of the vapor should occur, as for example, where prolonged recirculation might result in undesirable secondary reactions. In the example illustrated, the probability of 100 or more recirculations is quite low.

The foregoing suggests a compromise arrangement such as diagrammed in Figure 5. In this arrangement three loops are provided as in Figure 3 at F, G and H but bleeding back to the first loop occurs at J. The arrangement may also be regarded as that of Figure 4 provided with by-passes from the various return passages. It will be evident that the characteristics of this arrangement will be intermediate between those of Figures 3 and 4, approaching one or the other depending upon the relative flows permitted to occur through the by-passes and the returns to the first loop.

While for simplicity of description three loops have been described, it will be evident that the same considerations apply to two loops or more than three. The number of loops depends, of course, upon the desired results.

Figure 7:
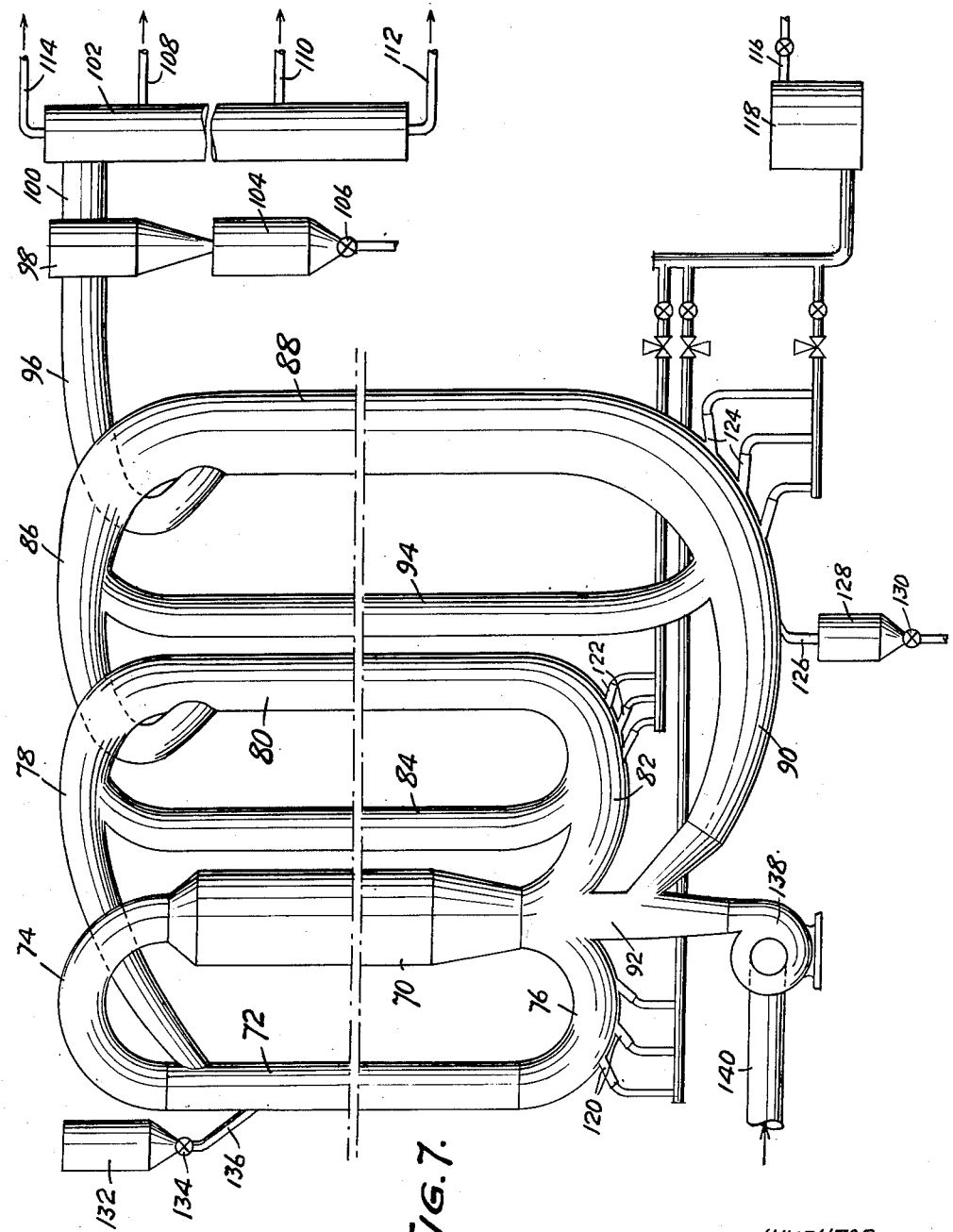
Figure 7 is a diagrammatic elevation of an alternative form of apparatus provided in accordance with the invention.

Figure 7 shows an apparatus which in contrast with Figures 1 and 2 involves a recirculatory action in accordance with Figure 5. In this apparatus a main upflow stack 70 is connected to form a first loop with the turn 74, the downflow stack 72 and the lower turn 76 into which high pressure elastic fluid is introduced through nozzles 120 to produce circulation. The outlet connected to the second loop is indicated at 78 and communicates with a downflow passage 80 which, in turn, is connected to the return bend 82 to the bottom of the stack 70. A by-pass recirculatory passage is indicated at 84. A third loop comprises the outlet and connected passage 86 from the second loop, the downflow passage 88 and the return connection 90, there being also provided the by-pass passage 94. The return 90 may communicate with a lower extension of the stack 70 indicated at 92 and receiving low pressure vapor from a blower 138 and a supply line 140. High pressure nozzles 122 and 124 may be associated with each of the second and third loops as indicated. All of the nozzles may receive high pressure vapor from a vaporizor 118 supplied with liquid through a connection 116. It will be evident that the disposition of the nozzles is subject to wide variation depending upon the particular relative circulation desired and the amounts of elastic fluid at high pressure which are to be introduced. These nozzles, furthermore, may be provided with individual control valves so as to change to any desired degree the nature of the circulation which occurs. The advantage of the arrangement of Figure 7 is as indicated above, to secure control of the recirculatory action and the average paths of the molecules of vapor and also to provide more complete uniform circulation in the various loops. It will be noted that in the modification of Figures 1 and 2 substantially different sizes are illustrated for the various downflow passages. These sizes would normally be required to have even greater differences if substantially the same velocities were to occur in all of the passages. In an apparatus such as that of Figure 7 somewhat better equalization of velocities may be secured, though this, it will be evident, is generally of minor importance.

The outflow of vapors which will generally be very low in content of liquid or solid material may pass to a separator 98 in which residual, non-gaseous materials may be separated out to be collected in the receiver 104 from which they may be removed through a valve 106. The vapor passing from the separator 98 is introduced through passage 100 through a condenser 102 from which various fractions may be taken at 108, 110 and 112 while fixed gases, or vapors which are not condensed, may be withdrawn at 114. The condenser is illustrated merely diagrammatically since it may take any conventional form and constitutes, in its construction, no part of the present invention.

Catalyst or other liquid, solid or semi-solid material may be introduced at any suitable point in the apparatus as, for example, from a hopper of a tank 132 through a metering valve 134 and connection 136. As in the case of the modification of Figures 1 and 2, the non-gaseous materials may be drawn off intermittently through the use of a take-off arrangement at 126, being received in a receiver 128 from which they may be removed through a valve 130.

The characteristics of operation will be as made clear above in connection with Figure 5. Generally speaking, with an equal number of loops, molecules of vapor will not remain for as long paths in the apparatus of Figure 7 as in the apparatus of Figures 1 and 2. Likewise, for comparable dimensional and flow characteristics the non-gaseous material will have a greater probability of escape than in the apparatus of Figures 1 and 2.

Figures 8, 9:
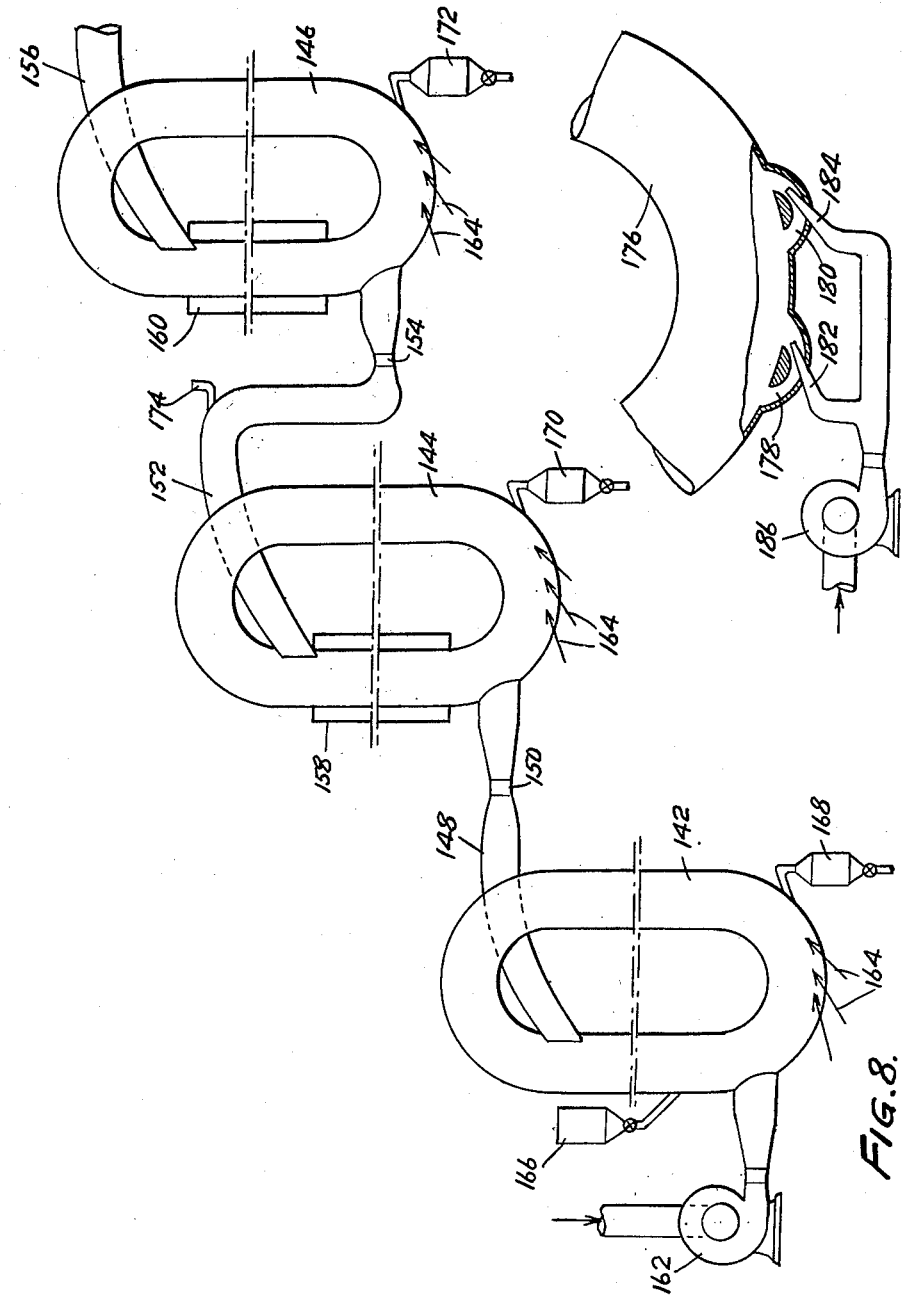
Figure 8 is a further diagram showing still another form of the invention.
Figure 9 is a fragmentary sectional view illustrating a detail of the apparatus particularly involving the renewed suspension in elastic fluid of liquid which may have separated therefrom.

In Figure 8 there is illustrated still another modified apparatus in accordance with the invention but involving the characteristics of Figure 3, that is, a major probability that a molecule of introduced vapor will not recirculate more than a certain number of times or will not have more than a predetermined total length of path. In this arrangement loops 142, 144 and 146, each involving recirculation within itself, are connected in series as indicated at 148 and 152. Constrictions 152 and 154 will serve to maintain the relative pressures in the various loops at desired values. All of the loops or any of them may be jacketed as indicated at 158 and 160 for either heating or cooling the materials recirculating therein. The larger portion of the elastic fluid may be introduced at relatively low pressure into the first loop through a blower 162. The nozzles 164 for maintaining recirculation in the loops may introduce only a minor proportion of the total elastic fluid under treatment. It will be evident that this principle of utilizing only a minimum amount of high pressure elastic fluid for treatment may be involved in any of the other modifications, low pressure fluid being introduced in larger proportion. It may be noted that the jets of elastic fluid are desirably of high velocity type not only to produce rapid and substantial recirculation but also generally to produce agitation of the non-gaseous materials as hereafter described. Non-gaseous materials may be introduced at 166 in the modification of Figure 8 or at any other desired location. Take-offs 168, 170, and 172 of the types heretofore described may be used to remove spent catalysts or other solid, liquid or semi-solid materials. Bleeders for the elastic fluid may be provided at any desired point, as for example at 174, to take off any desired proportion of the elastic fluid from various parts of the apparatus. The ultimate outlet 156 may lead to a fractionating device as previously described. It may be here pointed out that in any of the modifications condensed vapors may be revaporized and introduced either at high or low pressure or fixed gases or uncondensed fractions may be recompressed and/or reheated and used to feed the high pressure nozzles, thus recirculating through the entire apparatus including the associated parts such as condensers or the like.

If the suspended material is solid there is generally no trouble involved in maintaining it continuously in suspension. In the case of liquids or semi-solid materials, however, separation on the walls of the apparatus may occur thereby reducing the proportion of the material which remains in suspension. Such separating material may be resuspended by providing in connection with any of the modifications an expedient such as illustrated in Figure 9 herein. A typical lower bend 176 is illustrated with which communicate entraining passages 178 and 180 leading to high pressure nozzles 182 and 184 fed from a compresser 186 and arranged to provide jets in which the separated liquid or semi-solid material is again sprayed into suspension. Generally speaking, if a liquid is involved the droplets will be so small as effectively to provide fog which does not tend to separate rapidly on the walls of the apparatus under substantial rate of flow of the recirculated fluid. The arrangement of Figure 9, however, will serve to take care of such materials as do tend to separate. Even in the case of solid materials it is sometimes found that a certain proportion of the material in suspension will tend to separate along the walls and flow slowly along more or less like a liquid. Such separated particles may also be resuspended by the use of an arrangement such as illustrated in Figure 9.

Figure 10:
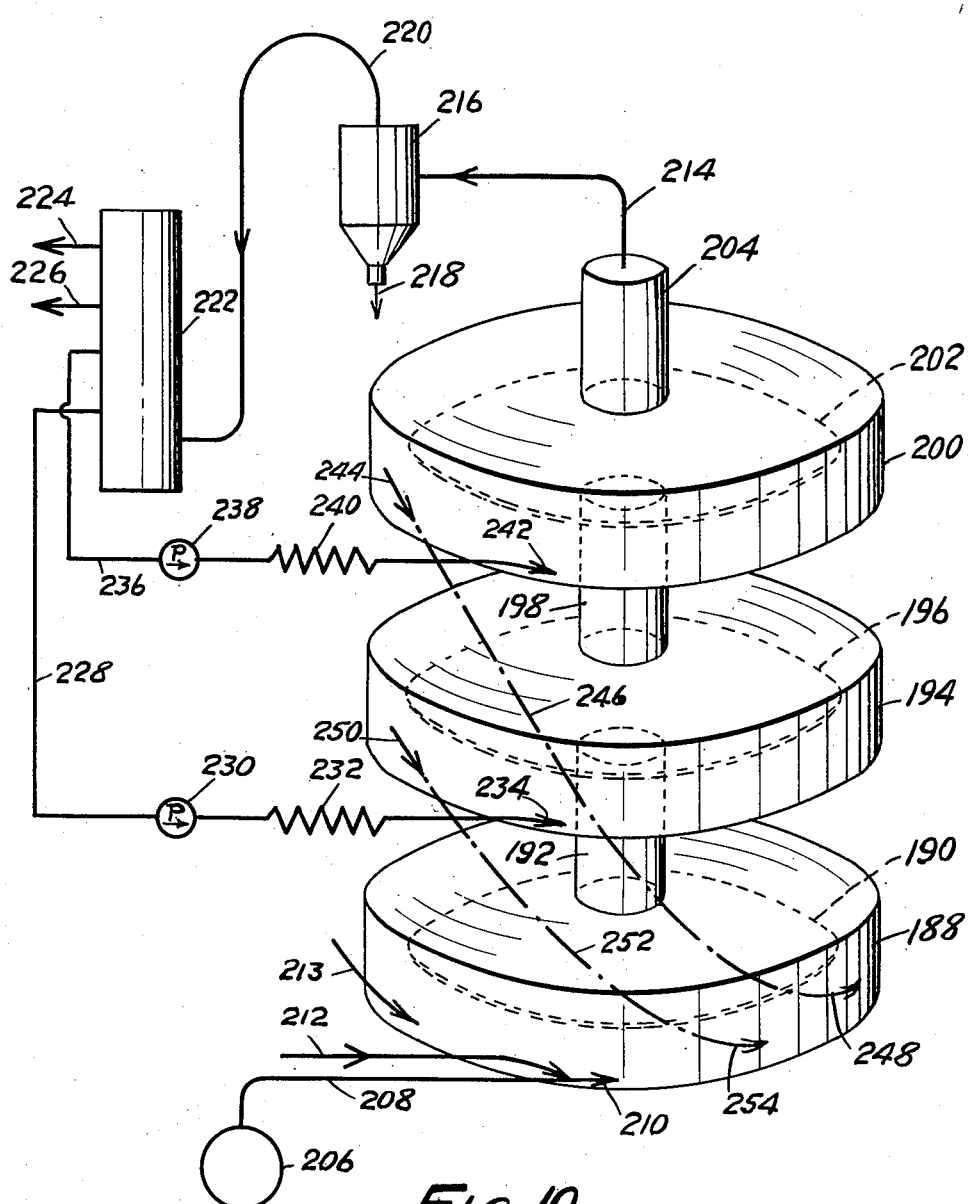
Figure 10 is a diagram illustrating another form of apparatus provided in accordance with the invention.

Figure 10 illustrates another form of apparatus embodying in a way the principles of Figure 5 though the various recirculatory passages may not, in this apparatus, be so clearly defined. In this apparatus a first stage is indicated at 188 in the form of a cylindrical drum which is provided with a central baffle 190 designed to force to the outer periphery of the drum any material in the lower portion thereof before it can get to the outlet 192. The outlet 192, in turn, communicates with the bottom of a second drum 194 provided with a baffle 196 similar to 190. The outlet 198 from the upper central portion of drum 194 in turn communicates with the bottom of a third drum 200 also provided with a central baffle 202 and a central outlet from its upper portion 204.

A vaporizer indicated at 206 may supply high pressure elastic fluid through connection 208 to one or more tangentially arranged nozzles 210 discharging jets into the interior of drum 188 to provide high velocity circulatory flow therein. Desirably such nozzles are located below the level of the baffle 190. Catalyst or other non-gaseous material may be injected into the apparatus by one or more of the nozzles from the passage 212. As in the case of the preceding modifications, low pressure elastic fluid may also be introduced through additional nozzles or merely through an additional passage such as indicated at 213. It will be evident that a high velocity of recirculating flow will occur within the drum 188 so that passing any unit area adjacent the periphery thereof there may be an amount of elastic fluid greatly in excess of the amount passing through an equivalent area of the outlet 192. Thus the drum 188 is somewhat equivalent to the first loop of the apparatus of Figure 5. At the same time, any solid or other non-gaseous material in the drum will be forced centrifugally outwardly both in the turbulent region below the baffle 190 and in the less turbulent region above the baffle. In this region above the baffle which is preferably free from high velocity jets the flow will be relatively smooth, though circulatory, and hence the probability of any but quite small particles reaching the outlet 192 will be small since centrifugal separation will occur above the baffle and there will be absent such turbulence as might carry larger particles to the exit against the centrifugal action.

Similar actions will occur in the drums 194 and 200. In connection with these there is illustrated the recycling of elastic fluid from the condensate from the treating apparatus. For example, the outlet 204 may be connected through passage 214 to a separator 216 from which residual solid or liquid material may be withdrawn after separation, as indicated at 218. The vapors freed from this material are then led through connection 220 to a condenser 222 in which fractional condensation is produced giving rise to desired fractions which pass out from 224 and 226. However, undesired fractions may pass out from 236 and 228 to high pressure pumps 238 and 230, being delivered by them through heat exchange vaporizers 240 and 232 to the nozzles 240 and 232 of the second and third stages. Of course, in place of condensed fractions fixed gases or uncondensed vapors may be returned to single or multiple nozzles such as 242 and 234 to maintain recirculation in these stages.

Without further provision it will be evident that the apparatus of Figure 10 would resemble primarily the apparatus of Figure 3. However, to provide greater retention of the non-gaseous materials and also to provide longer average paths for the molecules of the elastic fluid being treated by-pass connections may be provided as indicated. For example, from the third stage an outlet 244 may emerge tangentially being connected through passage 246 to a tangential entrance at 248 into the first stage. Likewise, from the second stage a tangential outlet 250 may be connected through passage 252 to a tangential inlet 254 of the first stage. Such by-passes may be multiplied if desired and will provide recirculation of the material, similar to that effected in Figure 5, back to the first stage. It will be noted that flow of elastic fluid through such passages is maintained both because of the tangential exits and because of the tangential inlets to the first stage due to a Pitot tube action whereby in particular an ejection effect is produced in the first stage. In short, the apparatus of Figure 10 is equivalent to that of Figure 5 though the precise passages through which the elastic fluid flows are not so sharply defined. The return of the elastic fluid through the by-passes may be particularly accentuated if high pressure nozzle jets are used to eject flow from the by-pass connections. While these by-passes serve to return elastic fluid it will be evident that they are very much more effective in securing return to the first stage of non-gaseous materials centrifugally separated in the second and third stages. In this way, and with the setting up of proper velocities, the probability of escape at 204 of non-gaseous materials may be reduced almost to the extent described in connection with Figure 4.

As in the case of the preceding modifications it will be evident that catalyst or other material may be introduced at any desired points in any of the stages and there may also be provided take-offs to remove spent material which otherwise would remain in the apparatus for very long periods of time, or substantially permanently if the particles remained of substantial size.

Figure 11:
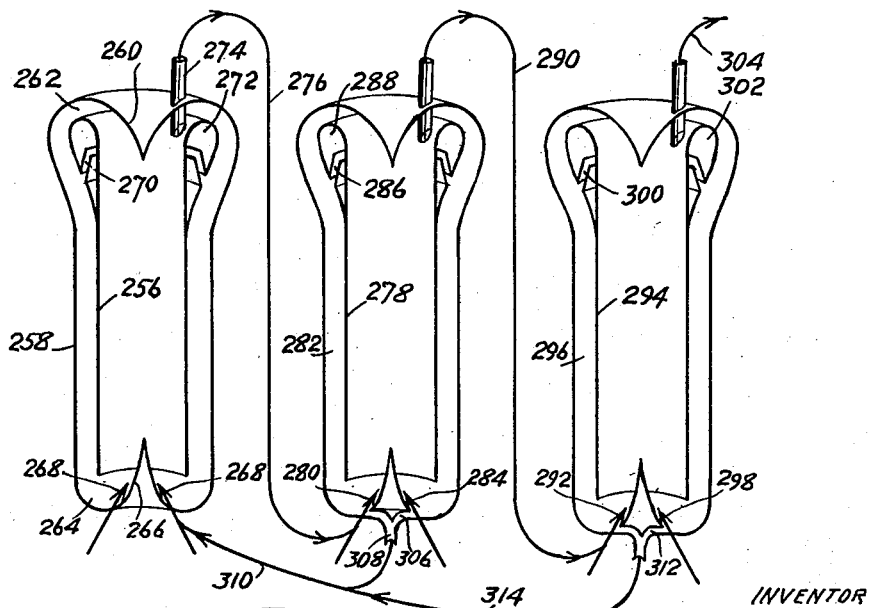
Figure 11 is a diagram of another type of apparatus also embodying the principles of the invention.

In Figure 11 there is illustrated still another modification of apparatus, the characteristics of which, from the standpoint of recirculation and maintenance of material in the apparatus, are similar to those of Figure 5. In this apparatus the first stage involves an upright tube 256, shown in section in Figure 11, flow upwardly through which occurs under the action of the jets emerging from nozzles such as 268. Exterior to the tube 256 is a concentric tube 258, through the annular space between which tube flow is guided by the deflector 260 projecting into the upper end of the tube 256 and closing the top of the apparatus. Circulatory flow takes place in the first stage, accordingly, upwardly through the tube 256 over its upper end at 262 downwardly through the annular passage 258 and back to the central tube 256 through the bottom return passage 264 under the action of the guide 266 which closes the lower part of the apparatus. As the material moves outwardly through the top passage centrifugal separation takes place throwing non-gaseous materials away from the backwardly directed slot outlets 270 which may be arranged annularly as indicated in the drawing. These communicate with an annular chamber 272 from which exit flow takes place through the pipe 274.

The second stage of this apparatus is generally similar to the first, comprising a central tube 278, flow through which is produced upwardly by nozzles 280 and 284, one of the nozzles indicated at 280 serving to eject flow from the connection 276 from the first stage. Recircuration accordingly occurs as in the first stage with centrifugal separation at the reverse outlet slots 286 so that while gaseous fluid may pass out carrying very small particles of non-gaseous materials, the major portion of the non-gaseous materials will not escape. The second stage differs from the first, however, in the provision of the central annular slot at 306 arranged to receive materials which are centrifugally separated in passing about the lower bend of the apparatus. Such materials entering the slot 306 will be received in the central tube 308 to be returned through the connection 310 to the first stage.

The elastic fluid leaving the second stage passes through the connection 290 to the third stage which is identical with the second including the ejector nozzle 292 aiding in the drawing of material through 290 from the second stage into the third, the central tube 294, the outer tube providing the annular downflow passage 296, the outlet slots 300 and the receiving chamber 302, the additional nozzle or nozzles 298 for producing upward flow through the tube 294 and the separating passage 312 for non-gaseous separated materials which serves to return them through connection 314 to the first stage. The return from both the second and third stages may be induced by the ejector action of one of the nozzles 268.

The elastic fluid finally emerges from the third stage at 304.

The various modifications herein described have, as will be evident, various common features and may all involve the carrying out of generally similar chemical actions. The nozzles which provide recirculation or injection or ejection actions may be fed either with the vapor or gas taking part in the chemical action or by an inert vapor or gas. Similarly, either inert vapor or gas or vapor or gas taking part in the chemical action may be introduced into the apparatus through the relatively low pressure sources or large quantity sources such as 34 of Figure 1, 140 of Figure 7 or 162 of Figure 8. In some cases the entire quantity of vapor or gas involved in the apparatus may be that taking part in the action. In other instances, however, it is desirable to dilute the active elastic fluid with an inactive or inert one to provide control of rate of reaction, concentration, heating or cooling. For example, some reactions may occur with such rapidity as to give rise to explosive effects which, by the generation of large quantities of heat, may cause ultimate products of undesired nature to be produced. The rate of reaction in such cases may be slowed down by the presence of a suitable quantity or proportion of inert elastic fluid. As examples may be cited controlled oxidation reactions in which, for example hydrocarbons or alcohols or the like may be desirably oxidized to provide aldehydes, ketones, acids or other products by subjection to controlled oxidation. If air is used as the oxidizing agent it may produce oxidation at too high a rate if undiluted. In such cases the oxygen or air may be diluted with a large quantity of nitrogen, carbon dioxide or other gas so that an oxidation rate proceeding in the presence of a catalyst may be held within proper bounds. In general the economies of the operation and the relative quantities of the elastic fluids introduced will determine whether they are to be introduced at high or low pressure. If an elastic fluid is to be produced by the boiling of a liquid it will, of course, generally be economical to effect the boiling in a high pressure boiler and feed the nozzles with the vapor rather than to attempt to compress an inert or other gas to feed the same nozzles, it being generally cheaper to introduce a gas in large quantities at low pressure, as, for example, by the action of a blower as illustrated.

As indicated heretofore the improved method and apparatus are of very general application and little can be gained by specifically mentioning examples of the processes to be carried out in general between solids and liquids on one hand and vapors and gases on the other; or liquids may be reacted with each other or with solids where the time of reaction is important and fineness of subdivision is also important, for example, for control of the temperature of reaction or for the production of an ultimate finely divided product.

If reactions between or involving solids and/or liquids are to be carried out these may be introduced and dispersed through different nozzles or at different parts of the apparatus with ultimate admixture of the suspensions, or alternatively if the reaction will not occur at the feed temperature but will occur at a higher temperature in the reaction vessel that end may be attained by introducing the materials in admixture through the nozzles to form a dispersion in a zone at proper temperature. The treatment of materials in this fashion is more fully described in my application, Serial No. 460,401 referred to above and need not be here repeated. Generally speaking, reactions may be carried out under essentially the same temperature and pressure conditions as would normally be involved in carrying out the same reactions in batch or continuous processes. The merit of the present process lies primarily in the physical characteristics of handling of the materials, the control of reaction rates, the maintenance of large ratios of surface to volume, the cleaning of surfaces of particles or the presentation of renewed surfaces in droplets, the prevention of agglomeration etc.

Where reactions are mentioned above it will be understood that equally included are what might be more aptly termed actions occasioned by the presence of catalysts of liquid or solid which remain unchanged or essentially so at the end of the action. As pointed out above the invention is particularly applicable to such processes as catalytic cracking or other treatments of hydrocarbons. Under such circumstances conventional catalysts may be used with conditions of the actions corresponding generally to those heretofore used in bulk or other processes. As pointed out above, cracking by the use of so-called fluid catalysts may be carried out in the present apparatus and by the present methods far more advantageously than in the conventional high stacks since greatly prolonged action times may be provided as well as such high velocities and turbulence as will produce very extensive contact cleaning of catalyst surfaces which latter in general not only remove depositions of coke but will prevent the initiation of such depositions. Additionally desirable in such cases is the control which may be exercised over temperature, particularly since in some cases inert gas or vapor may be introduced in the apparatus to reduce the concentration of the vapor which is undergoing action. As indicated, for example in Figure 10 and equally applicable to the other types of apparatus herein disclosed, the fixed gas or other vapors may be used as diluents or for supplying the high velocity jets which maintain circulation or other actions. Innumerable reactions will occur to those skilled in the art as particular applications of the invention. Particularly there may be mentioned the catalytic treatment of such mixtures as carbon monoxide and hydrogen in the presence of cobalt, nickel and iron catalysts together with various metallic oxides to produce hydrocarbons in the well-known processes for production of synthetic petroleum as, for example, by the Fischer-Tropsch process.

Grinding may be a major action involved in the treatment of solids with vapors or gases. Such grinding will, of course, expose new surfaces and will also give rise to enormous ratios of surface to volume of such solid materials. By the use of intense jets of high velocity type substantially any solids may be readily reduced in the types of apparatus described to particles of micron sizes. Under such conditions very high reaction rates may be secured as compared with the rates which are possible when gases or vapors are passed in the conventional fashion in contact with granulated solid materials in bulk.

Destructive distillations may be carried out by the application of heat with gas or vapor action as a mere carrier or diluent or for the introduction of the necessary heat or for control of reaction rates which are of exothermic type. Reference may be made particularly to the pulverization of solids of porous material wherein the pores are saturated either by volatile liquid or by gas or vapor under pressure when subjected to quick reduction of pressure as will occur when they are introduced through high pressure nozzles under such circumstances that the internal pressure existing in the pores will frequently produce explosive disintegration. As examples of this may be cited such disintegration of coal or similar carbonaceous porous materials if in their original state under high pressure or low temperature they contain water or other volatile liquid and are quickly introduced through the nozzles into a zone of high temperature or low pressure giving rise to conditions above the boiling point of the liquid.

While recirculation has been specifically indicated as effected by the use of high velocity jets it will be evident that blowers or fans may be provided in the circuits of the apparatus to provide the necessary recirculation.

Where high velocity jets are involved it is generally desirable to produce them by critical or greater than critical pressure drops through nozzles of abrupt or De Laval type. The jets issuing from the nozzles under such conditions have, in at least a portion thereof, a velocity of flow at least equal to the velocity of sound in the fluid of the jet having the same pressure and temperature as said portion of the jet. While jets of lower velocity type may be effectively used under some circumstances such high velocity jets are particularly desirable inasmuch as they not only produce high velocities for maintaining circulation or producing ejection or injection but they also create intense turbulence particularly if differently directed so as to intersect as, for example, in the modification of Figure 1. Such turbulence is desirable not only for grinding, if that be desired, but also to produce extremely rapid changes of exposed surfaces and for producing cleaning of solid particles to prevent accumulation of deposits or to remove the same if they have occurred.

It will be evident that the various types of apparatus described may have their parts permuted in various fashions depending upon the results desired. This will be particularly evident from consideration of Figures 3, 4 and 5 which represent distinct elemental types of apparatus which are capable of association in connection with individual or multiple parts thereof. Additionally, any of the apparatus herein described may be associated with other types of apparatus such as stacks or enlarged chambers dependent entirely upon the conditions of the actions which it is desired to maintain. In particular, it might be noted that the expedient illustrated in Figure 8 is applicable in general to various types of apparatus, namely, the maintenance in various parts of different pressure and temperature conditions either by the introduction of additional vapor or gas or by jacketing or direct heat.

The apparatus may also be used primarily for its separating effects. For example, as pointed out heretofore the apparatus of Figure 4 constitutes an excellent separator for the purpose of removing solid materials from elastic fluids. As such, an apparatus of this type may well be used as the final stage of another apparatus under which conditions it will function not only to serve to complete chemical action but as a very effective separator. The solid material may in such cases be withdrawn as by the types of apparatus indicated in particular in Figure 2.

What I claim and desire to protect by Letters Patent is:

1. The method of producing chemical action and maintaining prolonged contact between an elastic fluid and a non-gaseous material while continuously removing finer non-gaseous material comprising effecting suspension of the material in the elastic fluid; recirculating the suspension through an agitation zone in a closed first path to effect, by centrifugal force, a gradation in the distribution according to particle size of the suspended material in the elastic fluid; extracting from said first path in a direction substantially non-concurrent, at the point of extraction, with the direction of flow of the suspension in said first path material of a smaller particle size than the suspension recirculating in the said first path; subjecting the extracted suspension to curved flow in a second path to effect, by centrifugal force, a gradation in the distribution according to particle size of the suspended material in the elastic fluid; extracting from said second path a minor portion of the elastic fluid with entrained suspended material of smaller average particle size than the suspension extracted from said first path; and returning the remaining major portion of the elastic fluid, with entrained suspended material of larger average particle size than that extracted from said first path, to said closed first path.

2. The process as defined in claim 1 in which the elastic fluid includes a gas.

3. The process as defined in claim 1 in which the elastic fluid includes a vapor.

4. The process as defined in claim 1 in which the non-gaseous material is a catalyst.

5. The process as defined in claim 1 in which the non-gaseous material is a solid.

6. The process as defined in claim 5 in which intense agitation of the suspension is produced in at least one of said paths to clean the surfaces of the suspended solid material by mutual impacts.

NICHOLAS N. STEPHANOFF.

REFERENCES CITED

The following references are of record in the file of this patent:

UNITED STATES PATENTS

| Number | Name | Date |
| --- | --- | --- |
| 1,512,225 | Kipper | Oct. 21, 1924 |
| 2,237,091 | Stephanoff | Apr. 1, 1941 |
| 2,257,907 | Giswold | Oct. 7, 1941 |
| 2,351,091 | Bar | June 13, 1944 |
| 2,376,833 | Teter | May 22, 1945 |
| 2,391,723 | Mann | Dec. 25, 1945 |
| 2,419,097 | Stratford et al. | Apr. 15, 1947 |

FOREIGN PATENTS

| Number | Country | Date |
| --- | --- | --- |
| 513,947 | Great Britain | Oct. 26, 1939 |
| 546,088 | Great Britain | June 26, 1942 |